(12) United States Patent
Jang et al.

(10) Patent No.: US 9,240,840 B2
(45) Date of Patent: Jan. 19, 2016

(54) INTER-VEHICLE COMMUNICATION APPARATUS AND METHOD USING VISIBLE LIGHT COMMUNICATION

(71) Applicant: Electronics and Telecommunications Research Institute, Daejeon (KR)

(72) Inventors: Il-Soon Jang, Daejeon (KR); Tae-Gyu Kang, Daejeon (KR); Sang-Kyu Lim, Daejeon (KR); Dae-Ho Kim, Daejeon (KR); Jin-Doo Jeong, Daejeon (KR); You-Jin Kim, Daejeon (KR); Hyun-Jong Kim, Cheongju-si (KR); Seong-Hee Park, Daejeon (KR); In-Su Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 289 days.

(21) Appl. No.: 13/915,841

(22) Filed: Jun. 12, 2013

(65) Prior Publication Data

US 2013/0343768 A1    Dec. 26, 2013

(30) Foreign Application Priority Data

Jun. 25, 2012 (KR) ........................ 10-2012-0067812

(51) Int. Cl.
*H04B 10/116* (2013.01)
*H04B 1/692* (2011.01)
(Continued)

(52) U.S. Cl.
CPC .............. *H04B 10/516* (2013.01); *H04B 1/692* (2013.01); *H04B 1/707* (2013.01); *H04B 10/116* (2013.01); *H04J 13/0048* (2013.01)

(58) Field of Classification Search
CPC ....................................................... H04B 10/116
USPC .......................................................... 398/172
See application file for complete search history.

(56) References Cited

U.S. PATENT DOCUMENTS

| 2003/0035177 A1* | 2/2003 | Lupton et al. ................. 359/154 |
| 2008/0304833 A1* | 12/2008 | Zheng ........................... 398/135 |

(Continued)

FOREIGN PATENT DOCUMENTS

| KR | 1020090051723 A | 5/2009 |
| KR | 1020100049488 A | 5/2010 |

OTHER PUBLICATIONS

Kumar et al, Wireless Communications and Movile Computing Conference (IWCMC), 2011 7th internactoinal, Jul. 4-8, 2011, pp. 1513-1518.*

(Continued)

*Primary Examiner* — Leslie Pascal
(74) *Attorney, Agent, or Firm* — William Park & Associates Ltd.

(57) ABSTRACT

The present invention relates to an inter-vehicle communication apparatus and method using visible light communication. The inter-vehicle communication apparatus using visible light communication includes a spreading code application unit for applying a spreading code to transmission data desired to be transmitted, and a transmission unit for generating a transmission frame based on the transmission data to which the spreading code is applied, and transmitting the transmission frame via a lighting lamp of a vehicle. The transmission frame includes a preamble field required to synchronize the transmission frame, a data field required to transmit the transmission data, and a position field required to provide hopping information of the transmission data.

18 Claims, 8 Drawing Sheets

(51) Int. Cl.
*H04B 10/516* (2013.01)
*H04B 1/707* (2011.01)
*H04J 13/00* (2011.01)

(56) References Cited

U.S. PATENT DOCUMENTS

2009/0208221 A1* 8/2009 Sasai .............................. 398/130

2014/0280316 A1* 9/2014 Ganick et al. ................. 707/769

OTHER PUBLICATIONS

Kumar et al, Visible Light Communications in Intelligent Transportation System, 2012 Intelligent Vehicle Symposium, Spain Jun. 3-7, 2012, pp. 748-753.*

Terra et al, Design, Development and performance Analysis of DSSS-based Transciver for VLC, EUROCON, Apr. 27-29, 2011 pp. 1-4.*

* cited by examiner (PRIOR ART)
FIG. 1

INTER-VEHICLE COMMUNICATION APPARATUS AND METHOD USING VISIBLE LIGHT COMMUNICATION

CROSS REFERENCE TO RELATED APPLICATION

This application claims the benefit of Korean Patent Application No. 10-2012-0067812, filed on Jun. 25, 2012, which is hereby incorporated by reference in its entirety into this application.

BACKGROUND OF THE INVENTION

1. Technical Field

The present invention relates generally to an inter-vehicle communication apparatus and method using visible light communication and, more particularly, to an inter-vehicle communication apparatus and method using visible light communication, which reduce interference between pieces of data when performing wireless communication with another vehicle using lighting lamps for emitting visible light.

2. Description of the Related Art

Visible Light Communication (VLC) technology presented in Institute of Electrical and Electronics Engineers (IEEE) 802.15.7 VLC standards is communication technology for merging digital Light Emitting Diode (LED) illumination light with communication. Such VLC technology makes it possible to visibly verify whether communication has been performed, is harmless to a human body, and enables a physical security function or the like to be provided. In this case, an LED is advantageous in that it is capable of solving the problem of environmental destruction caused by mercury compared to existing lighting, that is, a fluorescent lamp and an incandescent lamp, and in that it has a long lifespan that is 10 times or more longer than that of the existing lighting and improves electrical efficiency by 90%. It can be considered that the creation of a communication environment using such a lighting infrastructure leads the way to communication that realizes the effects of economic benefits, the extension of multimedia communication services, and real-life lighting.

Recently, due to the exhaustion of Radio Frequency (RF) band frequencies, the possibility of confusion occurring between various types of wireless communication technologies, an increase in a demand for security of communication, and the arrival of a high-speed ubiquitous communication environment in 4G wireless technology, interest in optical wireless technology complementary to RF technology has increased, so that research into visible light communication using visible light LEDs has been conducted in various industrial fields.

As disclosed in Korean Patent No. 10-0908916, a method of transmitting data between vehicles using such visible light communication technology generally forms a network and transmits data over the network. However, this method is problematic in that respective vehicles have different speeds, and vehicles for transmitting and receiving signals are continuously changed, thus causing transmission and reception vehicles to be changed before a network is formed. Therefore, recently, instead of the method of forming a network and transmitting data, a broadcast method of allowing each vehicle to unilaterally transmit its own data has been proposed.

Figure 1:
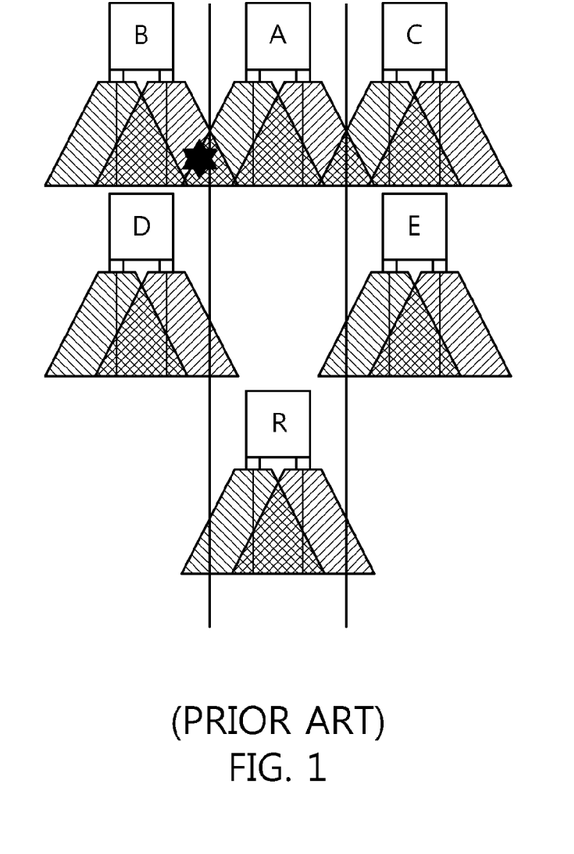
FIG. 1 is a scenario configuration diagram showing a conventional method of transmitting data between vehicles that use visible light communication technology.

FIG. 1 is a diagram showing a method of transmitting data between vehicles that use visible light communication technology in a broadcast manner as described above.

Referring to FIG. 1, reception vehicle R receives data from vehicle A traveling in the same lane as that of vehicle R and vehicles B to E traveling in left and right lanes. When vehicles A to E simultaneously broadcast data, that is, when they transmit data in the same band at the same time, there is a very high probability that an error will occur in the data received by the reception vehicle. Therefore, there is required a technology for preventing interference from occurring between pieces of data on the reception vehicle even if vehicles A to E simultaneously broadcast data. Therefore, interference between pieces of data is prevented using a scheme that utilizes orthogonal codes between pieces of transmission data. In this case, when codes between pieces of transmission data are identical to each other, there is a very high probability that an error will occur in the data received by vehicle R. Further, there is a problem in that, when there is a difference in timing between pieces of transmission data, the orthogonality of orthogonal codes may be damaged.

SUMMARY OF THE INVENTION

Accordingly, the present invention has been made keeping in mind the above problems occurring in the prior art, and an object of the present invention is to provide an inter-vehicle communication apparatus and method using visible light communication, which utilize spreading code and a time hopping scheme for transmitting transmission data in a broadcast manner when performing wireless communication with another vehicle using lighting lamps for emitting visible light, thus spreading and transmitting individual pieces of data while maintaining mutual orthogonality for the pieces of data.

In accordance with an aspect of the present invention to accomplish the above object, there is provided an inter-vehicle communication apparatus using visible light communication, including a spreading code application unit for applying a spreading code to transmission data desired to be transmitted; and a transmission unit for generating a transmission frame based on the transmission data to which the spreading code is applied, and transmitting the transmission frame via a lighting lamp of a vehicle, wherein the transmission frame includes a preamble field required to synchronize the transmission frame, a data field required to transmit the transmission data, and a position field required to provide hopping information of the transmission data.

Preferably, the data field may be configured to transmit the transmission data hopped using at least one of a time hopping scheme, a code hopping scheme, and a combination of the time hopping and code hopping schemes.

Preferably, the position field may indicate which pattern, among patterns corresponding to the time hopping scheme, the code hopping scheme, and the combination of the code hopping and time hopping schemes, has been used to hop the transmission data.

Preferably, the spreading code application unit may apply an identical spreading code to the transmission data and apply Spreading Factors (SFs) having different magnitudes to fields of the transmission frame.

Preferably, the spreading code application unit may apply a spreading factor greater than that of the data field to the preamble field, and apply a spreading factor greater than that of the data field and less than that of the preamble field to the position field.

Preferably, the spreading code application unit may apply different spreading codes to the transmission data depending on a transmission direction of the transmission data, and apply spreading factors having an identical magnitude to fields of the transmission frame.

Preferably, the spreading code application unit may apply a first spreading code to transmission data that is transferred to a vehicle located behind the corresponding vehicle via a left lighting lamp provided on a left portion of the corresponding vehicle, and apply a second spreading code to transmission data that is transferred to a vehicle located on a left side of the corresponding vehicle via the left lighting lamp.

Preferably, the spreading code application unit may apply a first spreading code to transmission data that is transferred to a vehicle located behind the corresponding vehicle via a right lighting lamp provided on a right portion of the corresponding vehicle, and apply a third spreading code to transmission data that is transferred to a vehicle located on a right side of the corresponding vehicle via the right lighting lamp.

In accordance with another aspect of the present invention to accomplish the above object, there is provided an inter-vehicle communication method using visible light communication, including applying a spreading code to transmission data desired to be transmitted; generating a transmission frame including a preamble field, a position field, and a data field, based on the transmission data to which the spreading code is applied; and transmitting the generated transmission frame via a lighting lamp of a vehicle.

Preferably, the applying the spreading code to the transmission data may be configured to apply an identical spreading code to the transmission data and apply Spreading Factors (SFs) having different magnitudes to fields of the transmission frame.

Preferably, when the spreading factors are applied to the fields of the transmission frame, a spreading factor greater than that of the data field may be applied to the preamble field, and a spreading factor greater than that of the data field and less than that of the preamble field may be applied to the position field.

Preferably, the applying the spreading code to the transmission data may be configured to apply different spreading codes to the transmission data depending on a transmission direction of the transmission data, and apply spreading factors having an identical magnitude to fields of the transmission frame.

Preferably, when the different spreading codes are applied to the transmission data, a first spreading code may be applied to transmission data that is transferred to a vehicle located behind the corresponding vehicle via a left lighting lamp provided on a left portion of the corresponding vehicle, and a second spreading code may be applied to transmission data that is transferred to a vehicle located on a left side of the corresponding vehicle via the left lighting lamp.

Preferably, when the different spreading codes are applied to the transmission data, a first spreading code may be applied to transmission data that is transferred to a vehicle located behind the corresponding vehicle via a right lighting lamp provided on a right portion of the corresponding vehicle, and a third spreading code may be applied to transmission data that is transferred to a vehicle located on a right side of the corresponding vehicle via the right lighting lamp.

Preferably, the generating the transmission frame may be configured such that the data field is required to transmit the transmission data hopped using at least one of a time hopping scheme, a code hopping scheme, and a combination of the time hopping and code hopping schemes.

Preferably, the generating the transmission frame may be configured such that the position field provides hopping information of the transmission data, wherein the hopping information indicates which pattern, among patterns corresponding to the time hopping scheme, the code hopping scheme, and the combination of the code hopping and time hopping schemes, has been used to hop the transmission data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail below with reference to the accompanying drawings to such an extent that those skilled in the art can easily implement the technical spirit of the present invention. Reference now should be made to the drawings, in which the same reference numerals are used throughout the different drawings to designate the same or similar components. In the following description, redundant descriptions and detailed descriptions of known elements or functions that may unnecessarily make the gist of the present invention obscure will be omitted.

Several vehicles are located around each vehicle that uses Visible Light Communication (VLC) and that is capable of selectively communicating with an arbitrary vehicle by individually determining distances and directions to a plurality of vehicles.

For example, a plurality of vehicles located around the corresponding vehicle are signal-transmission vehicles, and are configured to transmit signals via VLC. In this case, the signals transmitted from the vehicles may include unique numbers, such as the license plate numbers of the vehicles, the speeds of the vehicles, etc. Meanwhile, the corresponding vehicle is a signal-reception vehicle, and receives signals output from the plurality of vehicles located around it. The corresponding vehicle can obtain information about each of the plurality of vehicles located around it, based on the signals received from the vehicles, and can determine the locations (distances and directions) and the speeds of the respective vehicles from the obtained information.

Figure 2:
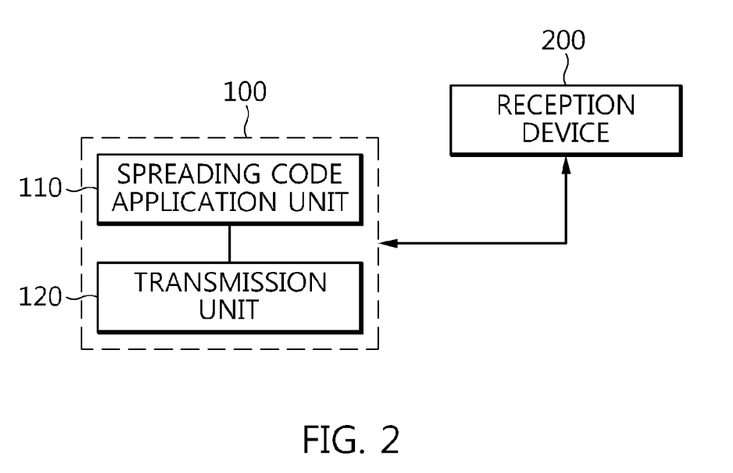
FIG. 2 is a block diagram showing the configuration of an inter-vehicle communication apparatus using visible light communication according to an embodiment of the present invention.

FIG. 2 is a block diagram showing the configuration of a communication apparatus for reducing interference between vehicles that use VLC according to an embodiment of the present invention.

Referring to FIG. 2, an inter-vehicle communication apparatus 100 using VLC according to the present invention may include a spreading code application unit 110 and a transmission unit 120.

Here, the communication apparatus 100 performs transmission/reception of data to/from the reception devices 200 of vehicles adjacent to the corresponding vehicle via lighting lamps provided in the headlights or taillights of the vehicle.

The spreading code application unit 110 applies a spreading code to transmission data desired to be transmitted. The spreading code application unit 110 may utilize a method of calculating the spreading code on transmission data and orthogonally modulating the transmission data, and a method of applying a preset spreading code to the transmission data. In this case, the transmission data may include information about at least one of the unique number, location, traveling direction, and speed of the corresponding vehicle. Further, the spreading code may be any one of an Orthogonal Variable Spreading Factor (OVSF) code, a Pseudo random Noise sequence (PN) code, and a Walsh code.

The transmission unit 120 generates a transmission frame based on transmission data to which the spreading code is applied, and transmits the transmission frame via the lighting lamps of the vehicle. In this case, the transmission frame may be composed of a preamble field required to synchronize the transmission frame, a position field required to provide the hopping information of the transmission data, and a data field required to transmit the transmission data. The data field indicates that data is hopped using at least one of a time hopping scheme, a code hopping scheme, and a combination of the time hopping and code hopping schemes, and the position field indicates which pattern, among patterns corresponding to the time hopping scheme, the code hopping scheme, and the combination of the code hopping and time hopping schemes, has been used to hop the transmission data.

Further, the spreading code application unit 110 according to the present invention may apply the same spreading code to transmission data and apply spreading factors having different magnitudes to the fields of a transmission frame, or apply different spreading codes to transmission data depending on the direction in which the transmission data is desired to be transmitted and apply spreading factors having the same magnitude to the fields of a transmission frame. In this case, such a Spreading Factor (SF) is defined as a spreading ratio indicating the number of bit strings in which an original data bit is to be spread. For example, a spreading factor of 8 means that one data bit is spread to be multiplied by 8 bit strings.

Figure 3:
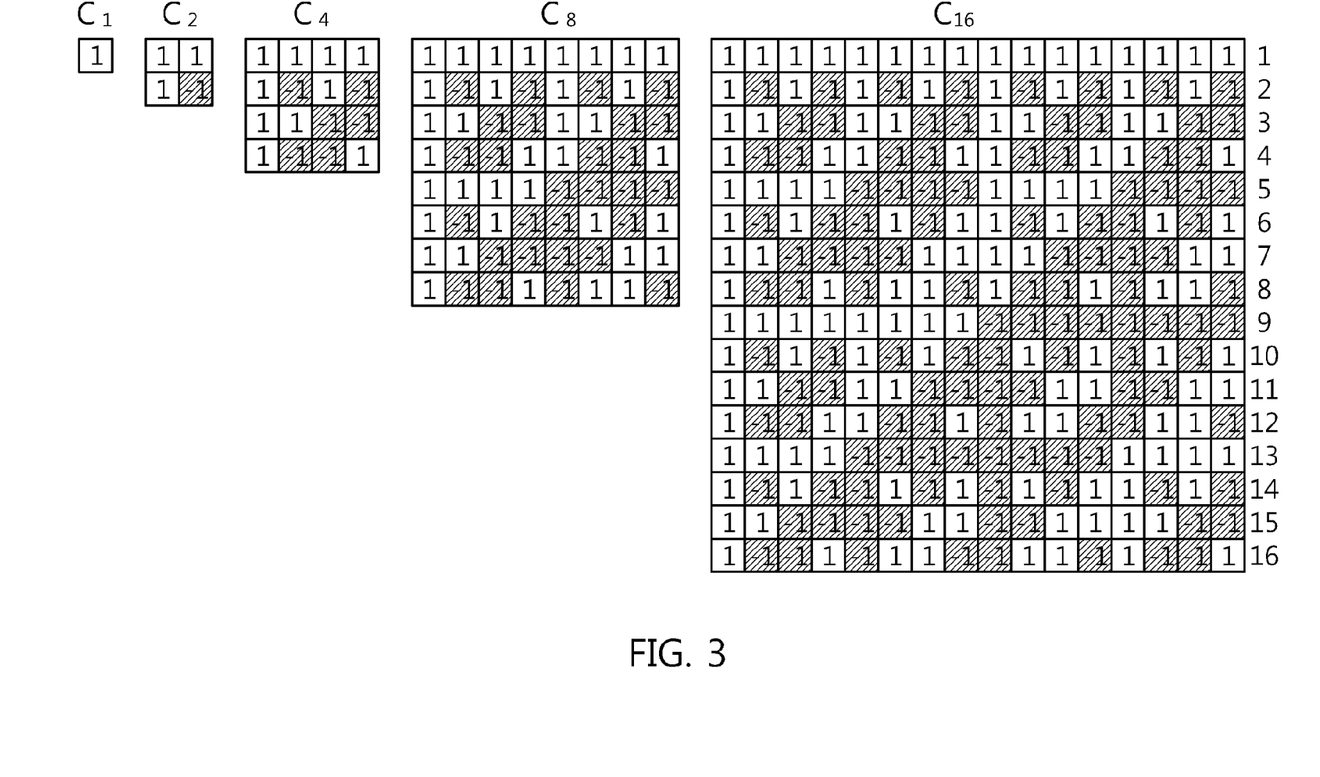
FIG. 3 is a diagram showing the generation of spreading codes having orthogonality according to an embodiment of the present invention.

FIG. 3 is a diagram showing the generation of spreading codes having orthogonality according to an embodiment of the present invention.

Referring to FIG. 3, the present invention uses the same frequency band when transferring transmission data, and uses spreading codes so that interference does not occur between pieces of data even if the pieces of data are transmitted in the same time band. Codes having orthogonal properties between spreading codes can be generated and can be represented by the following Equation:

$$C_1 = 1$$
$$C_2 = [C_1 C_1; C_1 -C_1]; \ldots$$
$$C_{2n} = [C_{2n-1} C_{2n-1}; C_{2n-1} -C_{2n-1}]; \quad [\text{Equation}]$$

When two vehicles respectively transfer pieces of data using a spreading code having a spreading factor $C_{16}$, the vehicles transfer the pieces of data using code string #2 and code string #3, respectively. When vehicle A desires to transfer data 1 using code string #2, and vehicle B desires to transfer data 0 (calculated by "×−1") using code string #3, reception vehicle C receives the following data.

Data transferred from vehicle A is (1 −1 1 −1 1 −1 1 −1 1 −1 1 −1 1 −1 1 −1)*1 and data transferred from vehicle B is (1 1 −1 −1 1 1 −1 −1 1 1 −1 −1 1 1 −1 −1)*−1, and then reception vehicle C receives the sum of the two pieces of data, that is, (0, −2, 2, 0, 0, −2, 2, 0, 0, −2, 2, 0, 0, −2, 2, 0).

In this case, vehicle C can individually recognize the data transferred from vehicle A and the data transferred from vehicle B. Vehicle C can be aware of the data transferred from the transmission vehicle, that is, vehicle A, by applying code string #2 used by vehicle A to the received data, and can be aware of the data transferred from vehicle B by applying code string #3 used by vehicle B to the received data.

That is, when code string #2 is multiplied by the received data and the results of multiplication are summed, (0, −2, 2, 0, 0, −2, 2, 0, 0, −2, 2, 0, 0, −2, 2, 0)*(1 −1 1 −1 1 −1 1 −1 1 −1 1 −1 1 −1 1 −1)=(0, 2, 2, 0, 0, 2, 2, 0, 0, 2, 2, 0, 0, 2, 2, 0) is obtained, and the sum of the numbers is 16 which is greater than 0. Thus, it can be seen that "1" has been transferred.

Further, when code string #3 is multiplied by the received data and the results of multiplication are summed, (0, −2, 2, 0, 0, −2, 2, 0, 0, −2, 2, 0, 0, −2, 2, 0)*(1 1 −1 −1 1 1 −1 −1 1 1 −1 −1 1 1 −1 −1)=(0, −2, −2, 0, 0, −2, −2, 0, 0, −2, −2, 0, 0, −2, −2, 0) is obtained, and the sum of the numbers is −16 which is less than 0. Thus, it can be seen that −1 (logic 0) has been transferred.

In this way, different pieces of data can be simultaneously transferred using spreading codes. In this case, the reception vehicle must be aware of spreading codes that are used by transmission vehicles.

However, there is a problem in that if timing is not suitable when data is transmitted using spreading codes, orthogonality may be damaged. For example, at a spreading factor $C_4$, spreading codes #3 and #4 may be subjected to the damage of orthogonality when spreading code #3 is time-shifted and is recognized as spreading code #4. That is, for example, in the case when data is transferred to be spread using spreading code (1, 1, −1, −1), but the reception vehicle using a spreading code (1, −1, −1, 1) does not exactly find a start point, a problem may arise in that false data is received.

Therefore, the present invention applies spreading codes and a time hopping scheme to the transmission of transmission data in a broadcast manner, thus preventing interference from occurring on data between vehicles (inter-vehicle data).

Figure 4:
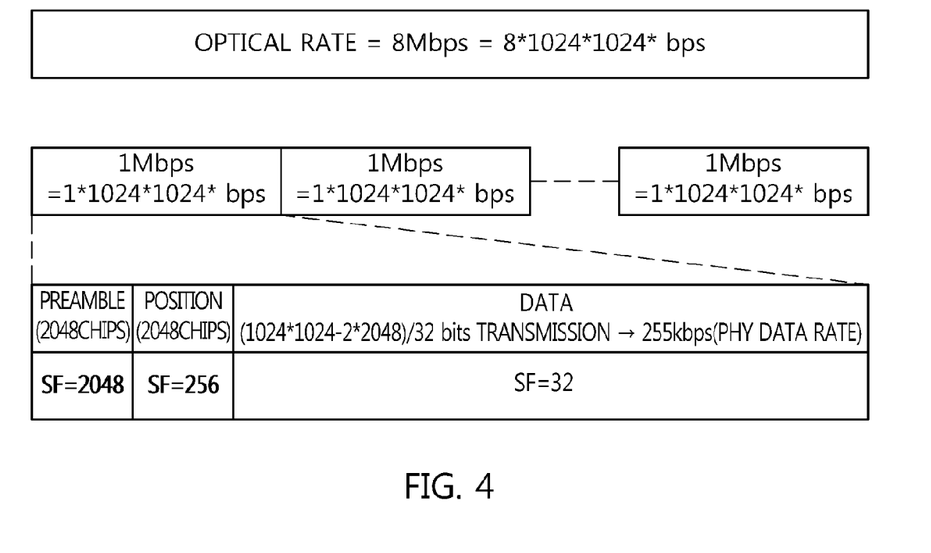
FIG. 4 is a diagram showing the structure of a transmission frame generated by calculating spreading codes on transmission data employed in an embodiment of the present invention.

FIG. 4 is a diagram showing the structure of a transmission frame using the same spreading code employed in an embodiment of the present invention.

Referring to FIG. 4, this structure denotes a scheme in which the same code is used in transmission data, and spreading factors having different magnitudes can be applied to the fields of a transmission frame.

In this case, values obtained by calculating a spreading code on transmission data are applied to a preamble field and a position field, and a value obtained by spreading the transmission data in the direction of a time axis using a time hopping scheme is applied to a data field. Further, a physical layer frame is assumed to have an optical rate of 8 Mbps.

In more detail, a spreading factor that is greater than that of the data field is applied to the preamble field. Further, a spreading factor that is greater than that of the data field and less than that of the preamble field is applied to the position field. In this case, it is preferable to perform collision processing on the spreading factor of the data field so as to reduce the number of collisions in the transmission of data.

Figure 5:
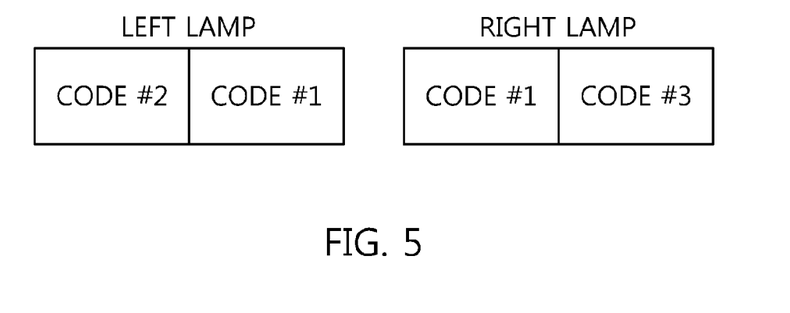
FIGS. 5 and 6 are diagrams showing the structure of the lighting lamps of a vehicle to which preset spreading codes are applied to transmission data employed in an embodiment of the present invention.

That is, in order to minimize collisions with an adjacent vehicle, the preamble field is designed so that, as shown in the following Table 1, a spreading factor=2048 is used and then the probability of collisions is decreased to 4% in the case of five transmission vehicles and to 1% in the case of three transmission vehicles.

of a vehicle, the present invention can previously set spreading codes that are used for left and right lamps in a vehicle lamp structure, as shown in FIG. 5. For example, two spreading codes are used in a single lamp, a first spreading code (Code #1) is used to transfer data to a vehicle located behind the corresponding vehicle in the same lane, and a second spreading code (Code #2) and a third spreading code (Code #3) are used to transfer data in the direction of left and right lanes. This procedure will be described in detail below.

Figure 6:
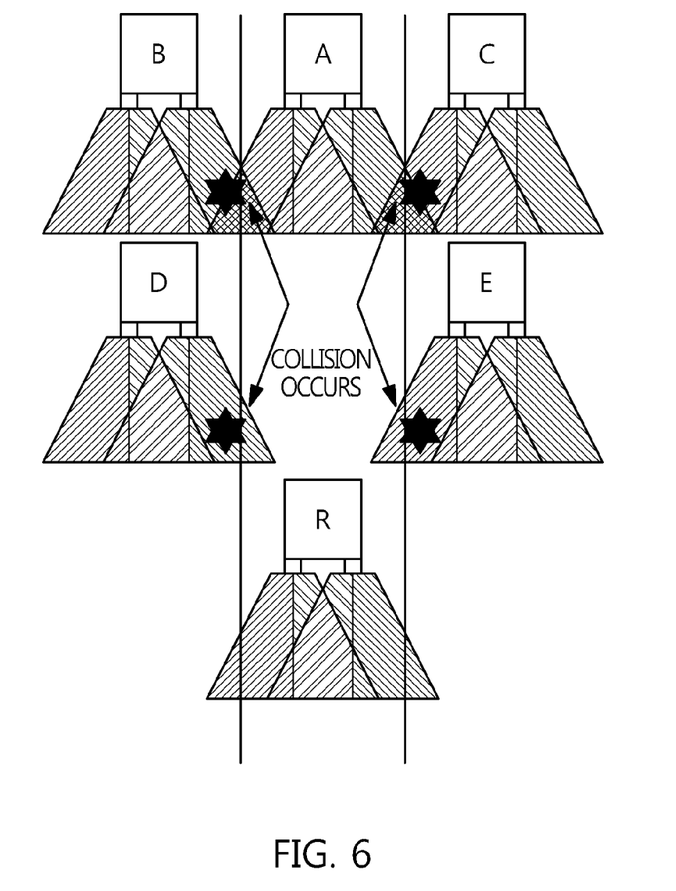

FIGS. 5 and 6 are diagrams showing the structure of lighting lamps of a vehicle to which different spreading codes are

TABLE 1

| Spreading factor[1] | Number of effective codes[2] | Number of exclusive codes[3] | Number of usable codes | Probability of all vehicles using different codes[4] | Data rate[5] [kbps] | Data rate when time hopping is applied[6] [kbps] |
|---|---|---|---|---|---|---|
| 16 | 8 | 4 | 4 | Impossible (5), 38%(3) | 501 | 102 |
| 32 | 13 | 4 | 9 | 26%, 69% | 255 | 51 |
| 64 | 21 | 4 | 17 | 52%, 83% | 127.5 | 25.5 |
| 128 | 34 | 4 | 30 | 70%, 90% | 63.75 | 12.75 |
| 256 | 55 | 4 | 51 | 82%, 94% | 31.875 | 6.375 |
| 512 | 89 | 4 | 85 | 89%, 96% | 15.9375 | 3.1875 |
| 1024 | 144 | 4 | 140 | 93%, 98% | 7.96875 | 1.59375 |
| 2048 | 233 | 4 | 229 | 96%, 99% | 3.984375 | 0.796875 |

[1] Spreading factor: the number of chips usable in a single symbol, and the total number of codes being able to be orthogonal
[2] Number of effective codes: the number of codes that maintain orthogonality even if a time shift occurs (there is a characteristic that when a time shift occurs in a spreading code, orthogonality is lost, so that when spreading codes are accumulated to as many as the spreading factor, only codes that do not exceed spreading factor/2 are selected)
[3] Exclusive codes: codes that are not used among effective codes (each code, the values of which are all "1", and each code used for a preamble field, a position field, and an idle pattern)
[4] Probabilities are calculated when the number of transmission vehicles that transfer data to reception vehicle R is 3 and 5 (when the number of vehicles is 3 and the number of usable codes is 4 at a spreading factor of 16, (4 * 3 * 2)/(4 * 4 * 4) = 37.5% is calculated)
[5] Data rate = optical rate/spreading factor, and 8 Mbps/16 = 512 kbps is obtained when an optical rate is assumed to be 8 Mbps and a spreading factor is 16
[6] Data rate is calculated as 512 kbps/5 = 102 kbps in the case where N = 5 is used when time hopping is performed on average at intervals of N (where N is the number of vehicles in a service environment), and a spreading factor is 16

A data transmission period in a physical layer frame has the influence of reducing the data rate when the spreading factor is a large value, so that the spreading factor is set to a small value. In this case, there is a method of applying a plurality of codes at a larger spreading factor, but it is expected to have the high risk of collisions, and then such a method is not taken into consideration. For example, when it is desired to use a spreading factor of 16 to increase the data rate, the transmission speed is a maximum of 512 kbps. In order to transmit data at 512 kbps without interference, transmission must be performed using different codes for respective vehicles. When there are five vehicles, as in the case of Table 1, a probability that the vehicles will have different effective codes at the spreading factor of 16 is 0% because the number of effective codes is 4, and is about 38% even if only three vehicles are considered. Therefore, it can be considered that there is a bare probability that data can be transmitted at the spreading factor of 16 without interference. If it is desired to transmit data at a probability of 90% or more without interference, the spreading factor must be 1024 and the transmission rate is reduced to 8 kbps.

In order to reduce such collisions, the present invention may consider a method of applying time hopping while using the spreading factor of 16 without change. Even if the same code is used, the number of collisions in the transmission of data is reduced by transmitting data in different time slots, and data can be transmitted if collisions stochastically occur within the range in which errors are recovered using an error correction technique. However, the structure of a current physical layer (PHY) frame does not provide a method of determining from which lane a relevant frame is being transferred.

Figure 7:
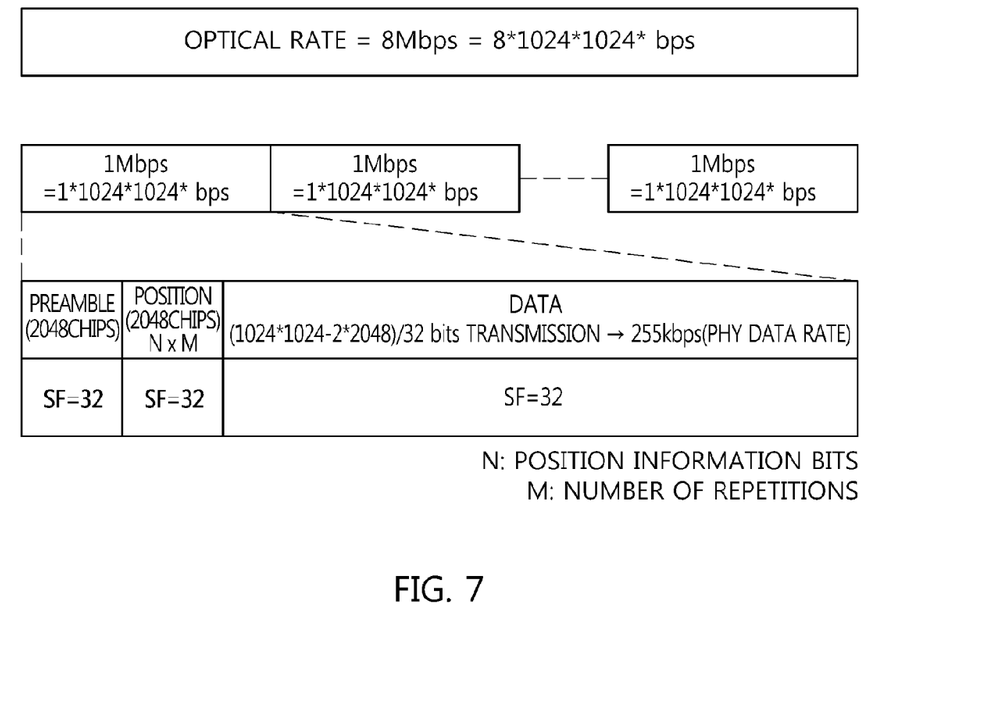
FIG. 7 is a diagram showing the structure of a transmission frame generated by applying preset spreading codes to transmission data employed in an embodiment of the present invention.

Therefore, in consideration of the case where data is transferred using spreading codes determined for respective lamps applied according to an embodiment of the present invention, and FIG. 7 is a diagram showing the structure of a transmission frame to which different spreading codes are applied and which is employed in an embodiment of the present invention.

Referring to FIGS. 5 and 6, a scheme using different spreading codes in transmission data is implemented, wherein spreading factors having the same magnitude can be applied to the fields of a transmission frame. That is, a first spreading code (Code #1) can be applied to transmission data that is transferred to a vehicle located behind the corresponding vehicle via a left lighting lamp provided on the left portion of the corresponding vehicle. A second spreading code (Code #2) can be applied to transmission data that is transferred to a vehicle located on the left side of the corresponding vehicle via the left lighting lamp. Further, the first spreading code (Code #1) can be applied to transmission data that is transferred to a vehicle located behind the corresponding vehicle via a right lighting lamp provided on the right portion of the corresponding vehicle. A third spreading code (Code #3) can be applied to transmission data that is transferred to a vehicle located on the right side of the corresponding vehicle via the right lighting lamp.

Referring to FIG. 7, different spreading codes are applied to transmission data, and the same spreading factor can be applied to individual fields of a transmission frame.

A collision in a preamble field does not occur because different fixed codes are used, so that the same spreading factor as that of a data field can be used. That is, in the preamble field, the position field, and the data field, the same spreading factor can be used.

Therefore, data can be transmitted at a data rate of 510 kbps when a spreading factor is 16 and at a data rate of 255 kbps when spreading factor is 32.

TABLE 2

| Spreading factor[1] | Number of effective codes[2] | Number of exclusive codes[3] | Codes usable in adjacent lane | Probability that vehicles in the same lane use different codes[4] | Probability that collision does not occur when time hopping is performed at N periods (N = 2 and two vehicles in same lane)[6] | Data rate[5], Time hopping: N period |
|---|---|---|---|---|---|---|
| 16 | 8 | 3 | 5 | (2 * 1)/(2 * 2) = 50.0%, Impossible for three vehicles | (4 * 3)/(4 * 4) = 75% | 8 Mbps/16 = 512/N kbps |
| 32 | 13 | 3 | 10 | 80%, 48% | 90.0% | 8 Mbps/32 = 256/N kbps |
| 64 | 21 | 3 | 18 | 89%, 69% | 84.4% | 128/N kbps |
| 128 | 34 | 3 | 31 | 93.3%, 80.9% | 96.6% | 64/N kbps |
| 256 | 55 | 3 | 52 | 96.2%, 88.8% | 98.1% | 32/N kbps |
| 512 | 89 | 3 | 86 | 97.6%, 93.1% | 98.8% | 16/N kbps |
| 1024 | 144 | 3 | 141 | 98.6%, 95.8% | 99.3% | 8/N kbps |
| 2048 | 233 | 3 | 230 | 99.1%, 97.4% | 99.6% | 4/N kbps |

[1] Spreading factor: the number of chips usable in a single symbol, and the total number of codes that are being able to be orthogonal
[2] The number of effective codes: the number of codes that maintain orthogonality even if a time shift occurs (there is a characteristic that when a time shift occurs in a spreading code, orthogonality is lost)
[3] Exclusive codes: each code, the values of which are all "1", each code used in the same lane, and an idle pattern (in an interval during which data is not transmitted, an idle pattern must be used, so that it is considered that spreading codes for the idle pattern are equally used)
[4] Codes that are usable for respective lamps are designated and applied, and respective probabilities are calculated in the cases where the number of vehicles in a left or right lane, which share codes applied to the left or right lane, is two (vehicles C and E) and is three
[5] When the optical rate is assumed to be 8 Mbps
[6] The number of selection variables is a total of 2 × 2 = 4 depending on two codes and two corresponding to time and space (this is identical to a probability of selecting different balls from among four balls)

In this case, when the same data is transmitted between two physical layer frames, a time hopping scheme and a non-time hopping scheme (a scheme for selecting only different codes) are compared with each other.

When the time hopping scheme is used, if the levels of reception power transferred from two transmission vehicles are identical, a probability that reception frames collide with each other at each time may be 25% (=100%−75%) when the spreading factor is 16 in Table 2. In order to recover an error of 25%, a channel coding algorithm can be used. Generally, in the case of a Reed-Solomon decoder, correction ability is t=(n−k)/2 in RS(n, k). Therefore, a relational expression between n and k for recovering the error of 25% needs only to satisfy t=(n−k)/2=0.25n (if correction ability is greater than the error, the error can be corrected) because the probability of causing an error in pieces of transmission data (n pieces of data) is 25%. Therefore, n=2k is satisfied, and n must be twice or more the amount of data so as to transfer data without causing an error. In this case, since a parity bit p=n−k and n=2k, p=k is obtained. Therefore, as many additional parity bits as the number of pieces of data must be used. Consequently, effective transmission speed is reduced by 50%. Further, when the spreading factor is 32, the effective transmission speed is reduced by 25% to transmit additional parity bits so that an error probability is attenuated by 10%.

When the same data is retransmitted twice without using a time hopping scheme, a probability that different spreading codes (a collision will not occur) will be used when two vehicles are present in one lane is 50%, referring to Table 2. When the same data is transmitted twice successively, a probability that a collision will occur twice is (100%−50%)*(100%−50%)=25%. When the same data is transmitted three times, a probability that a collision will occur three times is (100%−50%)*(100%−50%)*(100%−50%)=12.5%. Therefore, when the spreading factor is 16 at the same transmission speed, a probability that a collision will not occur when transmission is performed twice is 100%−12.5%=87.5%. When the spreading factor is 32, the probability is 80%. The case where transmission is performed twice at the spreading factor of 16 has a higher probability that a collision will not occur than the case when transmission is performed once at the spreading factor of 32. Further, at the same spreading factor, transmission speed caused by two repeated transmissions is reduced to ½. Furthermore, a probability that, at the spreading factor of 32, an error will not occur when transmission is performed twice is 96%. The data transmission speed is reduced to ½.

TABLE 3

| Spreading factor | Probability that vehicles in the same lane will use different codes 서로 다른 코드를 | Parity bits further required to recover error and transmission speed rate | Error rate and transmission speed rate in time hopping (N = 2) |
|---|---|---|---|
| 16 | (2 * 1)/(2 * 2) = 50.0%, impossible for three vehicles | 2[1], 50%[2] | 12.5%, 50% |
| 32 | 80%, 48% | 1.25, 80% | 0.8%, 50% |
| 54 | 89%, 69% | 1.13, 88% | 0.1%, 50% |
| 128 | 93.3%, 80.9% | 1.07, 93% | 0.0%, 50% |
| 256 | 96.2%, 88.8% | 1.04, 96% | 0.0%, 50% |
| 512 | 97.6%, 93.1% | 1.02, 98% | 0.0%, 50% |
| 1024 | 98.6%, 95.8% | 1.01, 99% | 0.0%, 50% |
| 2048 | 99.1%, 97.4% | 1.01, 99% | 0.0%, 50% |

[1] When $(n − k)/2 \geq ER \times n$ and $n \geq k/(1 − 2 \times ER)$, for example, ER = 25%, n ≥ 2k is satisfied. Accordingly, at the parity bit p = n − k, p requires a minimum number of k symbols. That is, this means 2k symbols obtained by summing k symbols for data to be transmitted and k symbols that are additionally required
[2] Reduced data rate depending on the extension of parity symbols from an existing data rate That is, as a method of determining and transmitting spreading codes depending on the directivity of vehicles or the like so as to discriminate lanes, a time hopping scheme exhibits better performance in the aspect of transmission speed.

Figure 8:
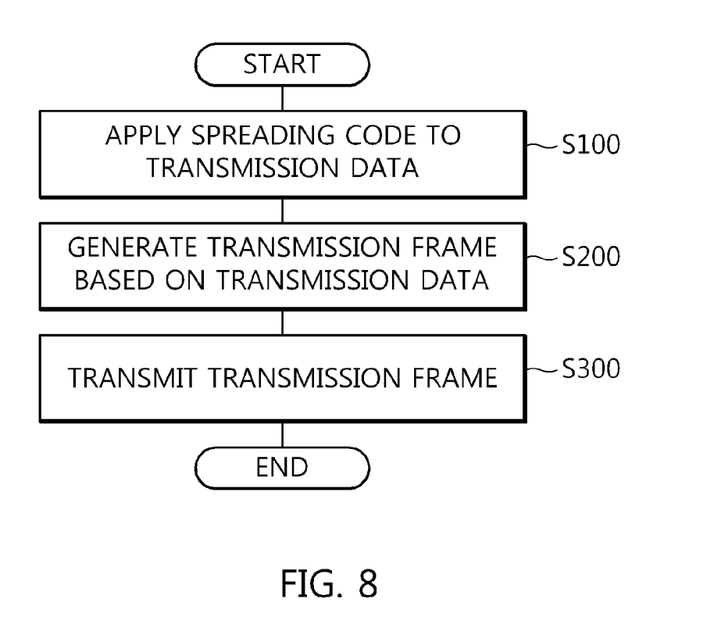
FIG. 8 is a diagram showing an inter-vehicle communication method using visible light communication according to an embodiment of the present invention.

FIG. 8 is a flowchart showing an inter-vehicle communication method using visible light communication according to an embodiment of the present invention.

Referring to FIG. 8, the inter-vehicle communication method using visible light communication according to the present invention applies a spreading code to transmission data that is desired to be transmitted at step S100. In this case, the transmission data may include information about at least one of the unique number, location, traveling direction, and speed of the corresponding vehicle. Further, when the spreading code is applied to transmission data, the same spreading code is applied and spreading factors having different magnitudes are applied to the fields of a transmission frame. Alternatively, different spreading codes are applied to transmission data depending on the direction in which the transmission data is desired to be transmitted, and spreading factors having the same magnitude can be applied to the fields of a transmission frame. In this case, when the same spreading code is applied to the transmission data, and spreading factors having different magnitudes are applied to the fields of the transmission frame, a spreading factor that is greater than that of a data field can be applied to a preamble field, and a spreading factor that is greater than that of the data field and less than that of the preamble field can be applied to a position field.

Further, when different spreading codes are applied to transmission data depending on the direction in which the transmission data is desired to be transmitted, and spreading factors having the same magnitude are applied to the fields of the transmission frame, a first spreading code can be applied to transmission data that is transferred to a vehicle located behind the corresponding vehicle via a left lighting lamp provided on the left portion of the corresponding vehicle. A second spreading code can be applied to transmission data that is transferred to a vehicle located on the left side of the corresponding vehicle via the left lighting lamp. The first spreading code can be applied to transmission data that is transferred to a vehicle located behind the corresponding vehicle via a right lighting lamp provided on the right portion of the corresponding vehicle. A third spreading code can be applied to transmission data that is transferred to a vehicle located on the right side of the corresponding vehicle via the right lighting lamp.

Next, based on the transmission data to which the spreading codes have been applied, a transmission frame composed of a preamble field, a position field, and a data field is generated at step S200. In this case, the transmission frame may be composed of a preamble field required to synchronize the transmission frame, a position field required to provide the hopping information of hopped transmission data, and a data field required to transmit the transmission data.

Next, the generated transmission frame is transmitted at step S300.

In this way, the present invention utilizes spreading codes and a hopping scheme for transmitting data when performing wireless communication with another vehicle using lighting lamps for emitting visible light, so that data can be spread and transmitted while mutual orthogonality is maintained for pieces of data, thus reducing interference between the pieces of data.

As described above, the inter-vehicle communication apparatus and method using visible light communication, having the above configuration, are advantageous in that spreading codes and a hopping scheme are utilized for transmitting data when performing wireless communication with another vehicle using lighting lamps for emitting visible light, so that data can be spread and transmitted while mutual orthogonality is maintained for pieces of data, thus reducing interference between the pieces of data.

Therefore, the present invention is advantageous in that even if a data-reception vehicle receives pieces of data transmitted from a plurality of data-transmission vehicles in a broadcast manner in which each data-transmission vehicle unilaterally transfers its own transmission data, interference can be prevented from occurring between pieces of data.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An inter-vehicle communication apparatus using visible light communication, comprising:
a spreading code application unit for applying a spreading code to transmission data desired to be transmitted; and
a transmission unit for generating a transmission frame based on the transmission data to which the spreading code is applied, and transmitting the transmission frame via a lighting lamp of a vehicle,
wherein the transmission frame includes a preamble field required to synchronize the transmission frame, a data field required to transmit the transmission data, and a position field required to provide hopping information of the transmission data,
wherein the spreading code application unit applies an identical spreading code to the transmission data and applies Spreading Factors (SFs) having different magnitudes to fields of the transmission frame.

2. The inter-vehicle communication apparatus of claim 1, wherein the data field is configured to transmit the transmission data hopped using at least one of a time hopping scheme, a code hopping scheme, and a combination of the time hopping and code hopping schemes.

3. The inter-vehicle communication apparatus of claim 2, wherein the position field indicates which pattern, among patterns corresponding to the time hopping scheme, the code hopping scheme, and the combination of the code hopping and time hopping schemes, has been used to hop the transmission data.

4. The inter-vehicle communication apparatus of claim 1, wherein the spreading code application unit applies a spreading factor greater than that of the data field to the preamble field, and applies a spreading factor greater than that of the data field and less than that of the preamble field to the position field.

5. An inter-vehicle communication apparatus using visible light communication, comprising:
a spreading code application unit for applying a spreading code to transmission data desired to be transmitted; and
a transmission unit for generating a transmission frame based on the transmission data to which the spreading code is applied, and transmitting the transmission frame via a lighting lamp of a vehicle,
wherein the transmission frame includes a preamble field required to synchronize the transmission frame, a data field required to transmit the transmission data, and a position field required to provide hopping information of the transmission data,
wherein the spreading code application unit applies different spreading codes to the transmission data depending on a transmission direction of the transmission data, and applies spreading factors having an identical magnitude to fields of the transmission frame.

6. The inter-vehicle communication apparatus of claim 5, wherein the spreading code application unit applies a first spreading code to transmission data that is transferred to a vehicle located behind the corresponding vehicle via a right lighting lamp provided on a right portion of the corresponding vehicle, and applies a third spreading code to transmission data that is transferred to a vehicle located on a right side of the corresponding vehicle via the right lighting lamp.

7. The inter-vehicle communication apparatus of claim 5, wherein the spreading code application unit applies a first spreading code to transmission data that is transferred to a vehicle located behind the corresponding vehicle via a left lighting lamp provided on a left portion of the corresponding vehicle, and applies a second spreading code to transmission data that is transferred to a vehicle located on a left side of the corresponding vehicle via the left lighting lamp.

8. The inter-vehicle communication apparatus of claim 5, wherein the data field is configured to transmit the transmission data hopped using at least one of a time hopping scheme, a code hopping scheme, and a combination of the time hopping and code hopping schemes.

9. The inter-vehicle communication apparatus of claim 8, wherein the position field indicates which pattern, among patterns corresponding to the time hopping scheme, the code hopping scheme, and the combination of the code hopping and time hopping schemes, has been used to hop the transmission data.

10. An inter-vehicle communication method using visible light communication, comprising:
applying a spreading code to transmission data desired to be transmitted;
generating a transmission frame including a preamble field, a position field, and a data field, based on the transmission data to which the spreading code is applied; and
transmitting the generated transmission frame via a lighting lamp of a vehicle,
wherein the applying the spreading code to the transmission data is configured to apply an identical spreading code to the transmission data and apply Spreading Factors (SFs) having different magnitudes to fields of the transmission frame.

11. The inter-vehicle communication method of claim 10, wherein when the spreading factors are applied to the fields of the transmission frame, a spreading factor greater than that of the data field is applied to the preamble field, and a spreading factor greater than that of the data field and less than that of the preamble field is applied to the position field.

12. The inter-vehicle communication method of claim 10, wherein the generating the transmission frame is configured such that the data field is required to transmit the transmission data hopped using at least one of a time hopping scheme, a code hopping scheme, and a combination of the time hopping and code hopping schemes.

13. The inter-vehicle communication method of claim 10, wherein the generating the transmission frame is configured such that the position field provides hopping information of the transmission data, wherein the hopping information indicates which pattern, among patterns corresponding to a time hopping scheme, a code hopping scheme, and a combination of the code hopping and time hopping schemes, has been used to hop the transmission data.

14. An inter-vehicle communication method using visible light communication, comprising:
applying a spreading code to transmission data desired to be transmitted;
generating a transmission frame including a preamble field, a position field, and a data field, based on the transmission data to which the spreading code is applied; and
transmitting the generated transmission frame via a lighting lamp of a vehicle,
wherein the applying the spreading code to the transmission data is configured to apply different spreading codes to the transmission data depending on a transmission direction of the transmission data, and apply spreading factors having an identical magnitude to fields of the transmission frame.

15. The inter-vehicle communication method of claim 14, wherein when the different spreading codes are applied to the transmission data, a first spreading code is applied to transmission data that is transferred to a vehicle located behind the corresponding vehicle via a left lighting lamp provided on a left portion of the corresponding vehicle, and a second spreading code is applied to transmission data that is transferred to a vehicle located on a left side of the corresponding vehicle via the left lighting lamp.

16. The inter-vehicle communication method of claim 14, wherein when the different spreading codes are applied to the transmission data, a first spreading code is applied to transmission data that is transferred to a vehicle located behind the corresponding vehicle via a right lighting lamp provided on a right portion of the corresponding vehicle, and a third spreading code is applied to transmission data that is transferred to a vehicle located on a right side of the corresponding vehicle via the right lighting lamp.

17. The inter-vehicle communication method of claim 14, wherein the generating the transmission frame is configured such that the data field is required to transmit the transmission data hopped using at least one of a time hopping scheme, a code hopping scheme, and a combination of the time hopping and code hopping schemes.

18. The inter-vehicle communication method of claim 14, wherein the generating the transmission frame is configured such that the position field provides hopping information of the transmission data, wherein the hopping information indicates which pattern, among patterns corresponding to a time hopping scheme, a code hopping scheme, and a combination of the code hopping and time hopping schemes, has been used to hop the transmission data.

* * * * *